US010440590B2

United States Patent
Knapp et al.

(10) Patent No.: US 10,440,590 B2
(45) Date of Patent: Oct. 8, 2019

(54) METHOD AND SYSTEM FOR CLOUD-BASED MANAGEMENT OF SELF-ORGANIZING WIRELESS NETWORKS

(71) Applicant: QUALCOMM Incorporated, San Diego, CA (US)

(72) Inventors: Edward Knapp, Basking Ridge, NJ (US); Rajat Prakash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 521 days.

(21) Appl. No.: 13/839,971

(22) Filed: Mar. 15, 2013

(65) Prior Publication Data
US 2014/0269364 A1 Sep. 18, 2014

(51) Int. Cl.
*H04L 12/24* (2006.01)
*H04W 24/02* (2009.01)
*H04W 84/18* (2009.01)

(52) U.S. Cl.
CPC .......... *H04W 24/02* (2013.01); *H04L 41/083* (2013.01); *H04L 41/0816* (2013.01); *H04L 41/0823* (2013.01); *H04W 84/18* (2013.01)

(58) Field of Classification Search
CPC ............ H04L 41/0816; H04L 41/0823; H04L 41/0826; H04L 41/083; H04L 41/0833; H04L 41/0836

(Continued)

(56) References Cited

U.S. PATENT DOCUMENTS 6,141,565 A * 10/2000 Feuerstein ............ H04W 16/06
455/422.1
6,631,128 B1 * 10/2003 Lemieux ............. H04L 12/5601
370/230

(Continued)

FOREIGN PATENT DOCUMENTS

CN 101636969 A 1/2010
CN 102938900 A 2/2013

(Continued)

OTHER PUBLICATIONS

Ericsson, "Text Proposal for Rel-11 TR Study on NM Centralized Coverage and Capacity Optimization (CCO) SON Function," 3GPP Draft; S5-122170_TP_TO_CCO_TR, 3rd Generation Partnership Project (3GPP), Mobile Competence Centre; 650, Route Des Lucioles; F-06921 Sophia-Antipolis Cedex; France, vol. SA WG5, No. Berlin, Germany; Aug. 20, 2012-Aug. 24, 2012; Aug. 24, 2012, XP050688502. (6 total pages).

(Continued)

*Primary Examiner* — Christopher M Crutchfield
(74) *Attorney, Agent, or Firm* — Arent Fox, LLP

(57) ABSTRACT

Disclosed are system and method for managing self-organizing wireless networks by a cloud server. In an aspect, the cloud server is configured to collect from a plurality of radio nodes of the wireless networks statistical and predictive information about accessibility and performance of said nodes; collect from a plurality of mobile devices connected to the wireless networks at least statistical and predictive information about performance, location, mobility and services of said devices; analyze the collected information to assess the performance, loading and distribution of network resource among the radio nodes; determine, based on the analysis, optimization guidelines for performance, loading and distribution of network resources among the radio nodes; and send the optimization guidelines to the radio (Continued)

nodes in order to optimize performance, loading and distribution of network resources at the radio nodes and to make resource optimization decisions specific to the individual mobile devices.

36 Claims, 5 Drawing Sheets

(58) Field of Classification Search
USPC .......................................................... 370/252
See application file for complete search history.

(56) References Cited

U.S. PATENT DOCUMENTS

| | | | |
|---|---|---|---|
| 7,941,136 B2 | 5/2011 | Reed et al. | |
| 2010/0195503 A1* | 8/2010 | Raleigh | H04L 41/0806 370/235 |
| 2010/0299419 A1 | 11/2010 | Ramankutty et al. | |
| 2011/0105184 A1* | 5/2011 | Piirainen | H04B 7/022 455/562.1 |
| 2011/0176424 A1 | 7/2011 | Yang et al. | |
| 2011/0267951 A1* | 11/2011 | Stanwood | H04L 41/5022 370/235 |
| 2012/0039175 A1* | 2/2012 | Sridhar et al. | 370/236 |
| 2012/0307697 A1 | 12/2012 | Mukhopadhyay | |
| 2014/0073354 A1* | 3/2014 | He et al. | 455/456.1 |
| 2014/0269354 A1 | 9/2014 | Su et al. | |
| 2014/0347193 A1* | 11/2014 | Ljung et al. | 340/870.01 |
| 2015/0024761 A1* | 1/2015 | Yatsu et al. | 455/445 |
| 2015/0181481 A1* | 6/2015 | Masini | H04W 36/0083 455/436 |

FOREIGN PATENT DOCUMENTS

| | | |
|---|---|---|
| JP | 2012-523186 A | 9/2012 |
| JP | 2013-502820 A | 1/2013 |
| JP | 2013-540380 A | 10/2013 |
| WO | WO-2011/021975 A1 | 2/2011 |
| WO | WO-2012/021320 A1 | 2/2012 |

OTHER PUBLICATIONS

Graybeal et al., "The evolution of SON to extended SON," Bell Labs Technical Journal, Wiley, CA, US, vol. 15, No. 3; Dec. 1, 2010, pp. 5-18, XP001558902.

"White Paper for mobile operators," http://airhopcomm-web.com/eson-white-paper-mobile-operators; Feb. 1, 2013, XP007922755, pp. 1-8.

International Search Report and Written Opinion dated Sep. 4, 2014 in International Application No. PCT/US2014/023070 (14 total pages).

* cited by examiner

METHOD AND SYSTEM FOR CLOUD-BASED MANAGEMENT OF SELF-ORGANIZING WIRELESS NETWORKS

BACKGROUND

Field

This disclosure relates generally to the field of wireless communications and more specifically to the system and methods for cloud-based management of self-organizing wireless networks comprising multiple macro, femto and WiFi nodes.

Background

Wireless communication systems are widely deployed to provide various types of communication content (e.g., voice, data, video, etc.) to mobile user devices. Typically, wireless communication systems are multiple-access systems capable of supporting communication with multiple mobile devices by sharing available radio resources (e.g., bandwidth, transmit power, etc.). Multiple-access wireless communication systems are generally divided into three categories: Radio Access Networks (RANs), such as Universal Mobile Telecommunication System (UMTS), Global System for Mobile Communications (GSM), third generation partnership project (3GPP) long-term evolution (LTE) systems, and other; Wireless Local Area Networks (WLANs), such as IEEE 802.11 (Wi-Fi), IEEE 802.16 (WiMAX), and other; and Wireless Personal Area Networks (WPANs), such as Bluetooth, and other.

A RAN coverage area is typically divided into multiple cells, which are commonly referred as macrocells, each cell having a radio base station, which is commonly referred as a macro node. These macrocells have large geographic coverage and provide wireless access to the RAN to mobile devices. To supplement conventional base stations, additional low power base stations, which are commonly referred as femtocells or femto nodes, can be ad hoc deployed to provide more robust wireless coverage and capacity in indoor environments, such as airports and shopping malls, without consideration for the general RAN infrastructure. In addition, 3G/4G wireless and personal LANs can be deployed by end users in their homes and offices to provide fast and cheap wireless network access.

The current generation of wireless communication systems supports distributed self-organizing network (SON) functions, which automate planning, configuration, management, and optimization of wireless networks. For example, self-configuration functions allow new macro and femto nodes (commonly referred as radio nodes) to automatically self-configure and integrate into the RAN. Distributed self-optimization functions allow radio nodes to more dynamically adjust various access, mobility and handover parameters based on real time observation of neighboring cells and proximate mobile devices. Self-healing functions helps to reduce the impacts of failure of one or more radio nodes by, for example, adjusting parameters and algorithms of neighboring cells, so that these cells can support the mobile devices' of the failing node.

However, most of the current distributed SON functions are preformed by processing data from sensing at the base station level (e.g., macro nodes or femto nodes) and are local in their self organizing impact on the wireless network. The centralized SON functions are limited to policy management of existing radio nodes and impact aggregate parameters across users on radio nodes in the network. Therefore, improvements in the management of self-organizing wireless networks are desired.

SUMMARY

The following presents a simplified summary of one or more aspects of systems, methods and computer program products for design of radio node sensing and cloud-based management of self-organizing wireless networks. In various aspects, the systems and methods disclosed herein provide for a combined cloud-based and distributed radio node-based infrastructure for optimal deployment and parameterization of planned and unplanned macro, femto and WiFi nodes in a self organizing wireless network. This summary is not an extensive overview of all contemplated aspects of the invention, and is intended to neither identify key or critical elements of the invention nor delineate the scope of any or all aspects thereof. Its sole purpose is to present some concepts of one or more aspects in a simplified form as a prelude to the more detailed description that is presented later.

In one aspect, a server-based method for management of self-organizing wireless networks includes collecting, by the server, from a plurality of radio nodes of the wireless network statistical and predictive information about accessibility and performance of these nodes and collecting from a plurality of mobile devices connected to the wireless networks at least statistical and predictive information about performance, location, mobility and services of these devices. The method further includes analyzing the collected information to assess the performance, loading and distribution of network resources among the plurality of radio nodes. The method further includes determining, based on the analysis, optimization guidelines for performance, loading and distribution of network resources among the plurality of radio nodes. The method further includes sending the optimization guidelines to the plurality of radio nodes in order to optimize performance, loading and distribution of network resources at these radio nodes and to make resource optimization decisions specific to the individual mobile devices.

In another aspect, a server apparatus for management of self-organizing wireless networks includes a network information collection component configured to collect and store measurements from a plurality of radio nodes of the wireless network at least statistical and predictive information about accessibility and performance of these radio nodes. The server apparatus further includes a mobile information collection component configured to collect from a plurality of mobile devices connected to the wireless network at least statistical and predictive information about performance, location, mobility and services of these devices. The server apparatus further includes an information analysis component configured to analyze the collected information to assess the performance, loading and distribution of network resource among the plurality of radio nodes. The server apparatus further includes a network optimization component configured to determine, based on the analysis in combination with individual radio nodes, optimization guidelines for performance, loading and distribution of network resources among the plurality of radio nodes. The server apparatus further includes a communication component configured to send the optimization guidelines from the cloud server to the plurality of radio nodes in order to optimize performance, loading and distribution of network resources at these radio nodes and to make resource optimization decisions specific to the individual mobile devices.

In another aspect, a server apparatus for management of self-organizing wireless networks includes means for collecting from a plurality of radio nodes of the wireless network at least statistical and predictive information about accessibility and performance of said radio nodes. The server apparatus further includes means for collecting from a plurality of mobile devices connected to the wireless network at least statistical and predictive information about performance, location, mobility and services of these devices. The server apparatus further includes means for analyzing the collected information to assess the performance, loading and distribution of network resource among the plurality of radio nodes. The server apparatus further includes means for determining, based on the analysis, optimization guidelines for performance, loading and distribution of network resources among the plurality of radio nodes. The server apparatus further includes means for sending the optimization guidelines to the plurality of radio nodes in order to optimize performance, loading and distribution of network resources at these radio nodes and to make resource optimization decisions specific to the individual mobile devices.

In yet another aspect, a computer program product for management of self-organizing wireless networks includes a non-transitory computer readable medium comprising code for causing at least one server computer to collect from a plurality of radio nodes of the wireless network at least statistical and predictive information about accessibility and performance of these nodes. The computer program product further includes code for causing at least one server computer to collect from a plurality of mobile devices connected to the wireless network at least statistical and predictive information about performance, location, mobility and services of these devices. The computer program product further includes code for causing at least one server computer to analyze the collected information to assess the performance, loading and distribution of network resource among the plurality of radio nodes. The computer program product further includes code for causing at least one server computer to determine, based on the analysis, optimization guidelines for performance, loading and distribution of network resources among the plurality of radio nodes. The computer program product further includes code for causing at least one server computer to send the optimization guidelines to the plurality of radio nodes in order to optimize performance, loading and distribution of network resources at said radio nodes and to make resource optimization decisions specific to the individual mobile devices.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

In various aspects, systems and methods for cloud-based management in combination with distributed of self-organizing wireless networks are disclosed herein. Various aspects will be described with reference to the drawings. In the following description, for purposes of explanation, numerous specific details are set forth in order to provide a thorough understanding of one or more aspects. It may be evident, however, that such aspect(s) may be practiced without these specific details. Furthermore, various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Figure 1:
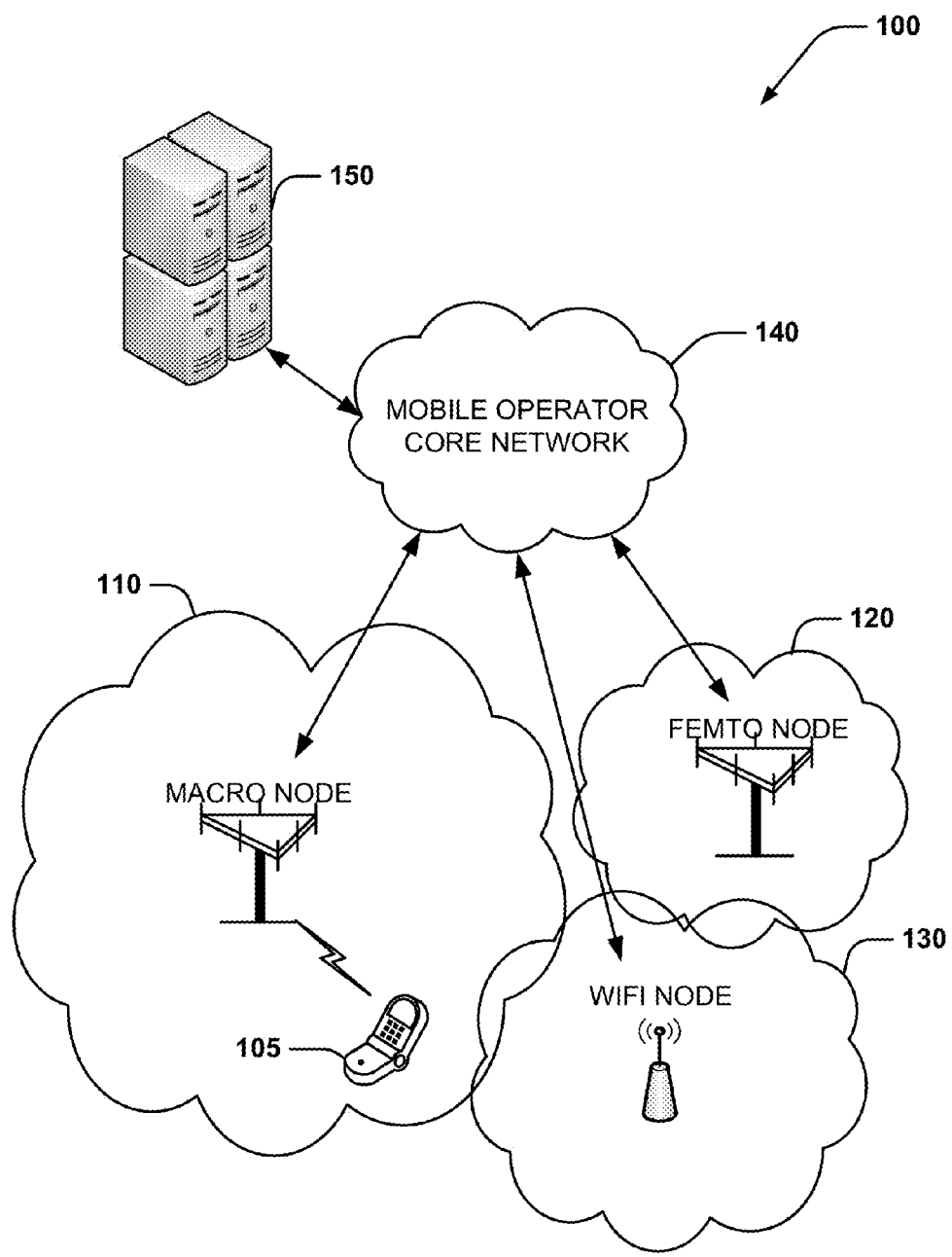
FIG. 1 is a block diagram of an example wireless communication system comprising a plurality of self-organizing wireless networks and a cloud server for management of the self-organizing wireless networks according to one aspect.

FIG. 1 illustrates one aspect of a wireless communication system 100 that includes a plurality of self-organizing wireless networks (also referred as wireless SONs), such as one or more different Radio Access Networks (RANs) represented by macro node(s) 110 and femto node(s) 120, as well as one or more Wireless Local Area Networks (WLANs) and Wireless Personal Arean Networks (WPANs) commonly represented by WiFi node(s) 130. Hereinafter macro node(s) 110, femto node(s) 120 and WiFi node(s) 130 will be commonly referred as radio nodes. In one aspect, these RANs, WLANs and WPANs are connected to a mobile operator core network 140 (also referred as backhaul) that provides telecommunication services (e.g., voice, data, video, etc.) to mobile device(s) 105 connected to the one of the radio nodes 110, 120 and 130. Mobile device 105 may include, but not limited to a cellular telephone, a cordless telephone, a session initiation protocol (SIP) phone, a personal digital assistant (PDA), a handheld device having wireless connection capability, a laptop computer, or other portable processing device having a cellular or wireless modem. Mobile device 105 may also be referred to as a subscriber unit, subscriber station, mobile station, mobile, remote station, remote terminal, access terminal, user terminal, terminal, wireless communication device, user agent, user device, mobile device or the like.

In various aspect, RANs represented by macro node(s) 110 and femto node(s) 120 can be implemented using various radio access technologies (RATs) and communication standards, such as code division multiple access (CDMA), time division multiple access (TDMA), frequency division multiple access (FDMA), orthogonal OFDMA, carrier sense multiple access (CSMA) and other technologies. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2).

In one aspect, a RAN may include a plurality of radio nodes 110 and 120 utilized for communicating with mobile device(s) 105. These radio nodes may include a high-power macro node(s) 110 and a low-power femto node(s) 120. The femto node 120 may also be referred to as a femtocell, an access point, a femto base station (BS), a pico node, a micro node, a Node B, an evolved Node B (eNB), a home Node B (HNB) or home evolved Node B (HeNB), collectively referred to as H(e)NB, or some other terminology. These femto node(s) 120 generally transmit at a relatively low power as compared to a macro node(s) 110. As such, the coverage area of the low power femto node 120 (e.g., femtocell) can be substantially smaller than the coverage area of a macro node 110 (e.g., macrocell). In another aspect, WLAN and WPAN may include a plurality of radio nodes 130, such as WiFi access points or Bluetooth access points. Clusters of ad hoc femto or WiFi nodes may provide coverage over a larger area thereby creating a separate service layer.

In various aspects, radio nodes 110, 120 and 130 of the wireless communication system 100 are configured to support one or more distributed SON functions, such as those disclosed in 3GPP TS 32.500. For example, the SON's self-configuration functionality allows new radio nodes to automatically self-configure and self-integrate into the wireless system 100. The SON's distributed self-optimization mechanisms allow radio nodes to more dynamically adjust various access, power, mobility and handover parameters based on real time observation of neighboring cells and proximate mobile devices. The SON's self-healing functionality helps to reduce the impacts of failure of one or more radio nodes by, for example, adjusting parameters and algorithms of neighboring cells, so that other cells can support the mobile devices' of the failing node.

More specifically, in one aspect, radio nodes 110, 120 and 130 may support self-configuration functions and algorithms, which allow radio nodes to automatically self-configure and integrate into the wireless communication system 100. For example, a radio node may self-configure its Physical Cell Identity (PCI), transmission frequency and power. The radio node can self-configure S1 and X2 interfaces with neighboring cells and the core network 140 and obtain IP addresses from network 140. Moreover, the radio node may use Automatic Neighbor Relations (ANR) function to identify and collect information about neighboring cells and set up Neighbor Relation Table (NRT), which facilitate faster cell handovers by mobile device(s) 105. In addition, the radio node can request measurement reports from proximate mobile device(s) 105, which allow the radio node to obtain cell IDs of neighboring cells, their transmission frequencies and power. From the collected information, the radio nodes 110, 120 and 130 can execute various self-configuration algorithms that integrate these radio nodes into the wireless system 100 without interference with the neighboring cells.

In another aspect, radio nodes 110, 120 and 130 may support self-optimization functions and algorithms, which allow radio nodes to dynamically adjust various access, mobility and handover parameters based on real time observation of neighboring cells and proximate mobile device(s) 105. For example, Mobility Load Balancing (MLB) function allows macro and femto cells suffering congestion to dynamically transfer load to other nearby cells, which have spare resources. MLB includes load reporting functionality between radio nodes to exchange information about load level and available capacity, such as average cell capacity used and available cell capacity, number of mobile devices served by the cell, number of established connections, number of dropped calls, and other related information by wireless node and across deployment layers. In another example, Mobility Robustness Optimization (MRO) function allows automatic detection and correction of errors in the mobility configuration of radio nodes, such as errors causing Radio Link Failure (RLF) due to too late or early handover or handover to an incorrect cell by mobile device(s) 105.

In yet another aspect, radio nodes 110, 120 and 130 may support self-healing functions and algorithms, which reduce the impacts of failure of the radio nodes. For example, some self-healing functions monitor and analyse relevant data like fault management, alarms, notifications, self-test results, etc. and automatically triggers or performs corrective actions on the affected radio nodes when necessary. Other self-healing functions provide automatic detection and localization of various software and hardware failures of a radio node and apply self-healing mechanisms to solve several failure classes, such as reducing the output power in case of temperature failure or automatic fallback to previous software version. In case of radio node failures, other self-healing functions can automatically adjust parameters and algorithms of neighboring cells, so that these cells can support the mobile devices' of the failing node.

Figure 2:
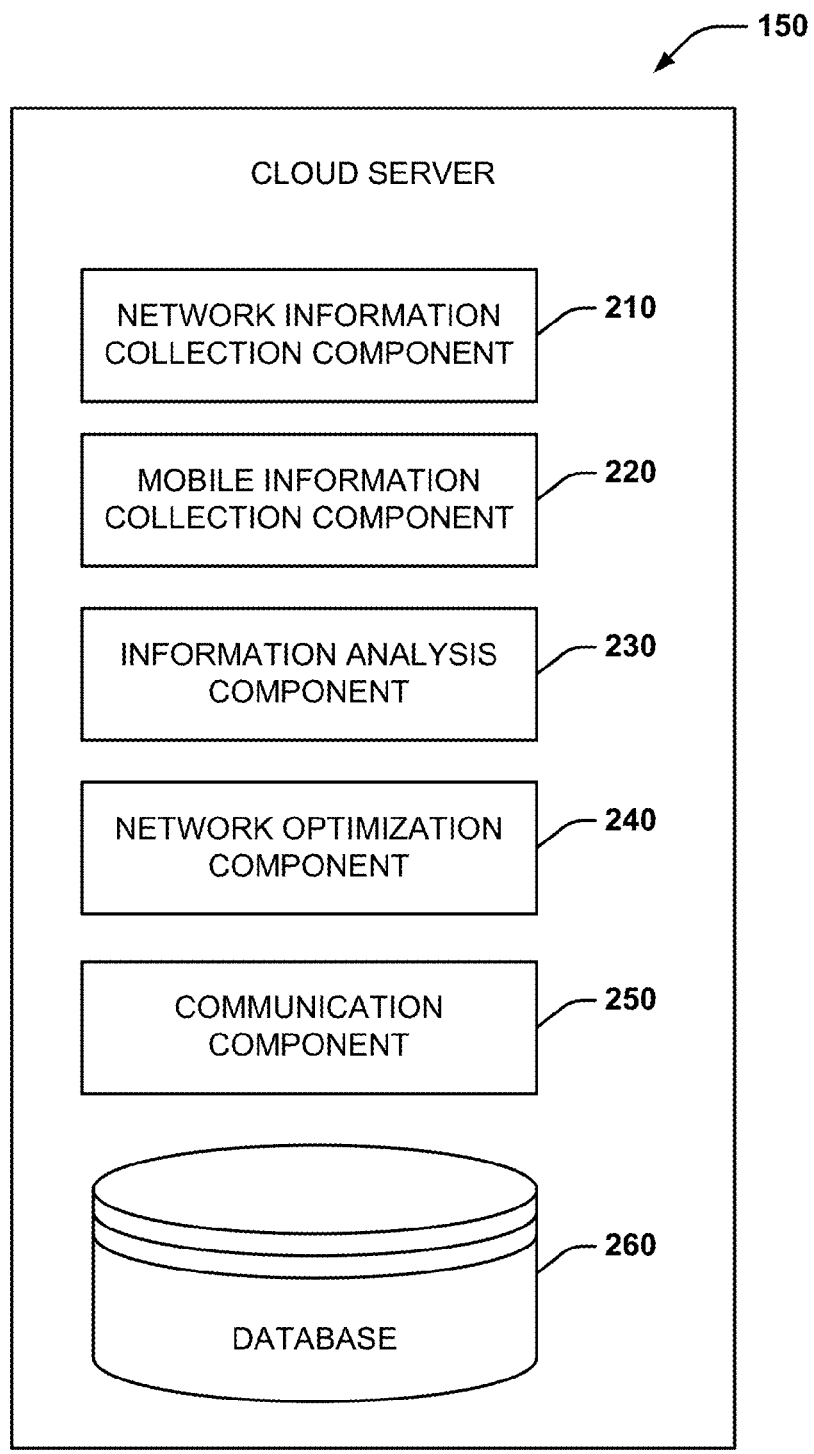
FIG. 2 is a block diagram of an example cloud server system for management of self-organizing wireless networks according to one aspect.

To supplement the distributed real-time SON functions of the individual radio nodes 110, 120 and 130, the wireless SON 100 may include, in one aspect, a cloud server 150 that provides centralized, non-real management and optimization of the entire wireless communication system 100, including management of the various RAN macro nodes 110 and femto nodes 120, management of the WLAN and WPAN nodes 130, as well as management of the mobile device(s) 105 connected to the RAN, WLAN and WPAN networks. The cloud server 150 may include one or more computer servers, such as blade servers, and databases, such as SQL databases, which are located in the mobile operator core network 140 or on an external network. In one aspect, the cloud server 150 may be operated by the operator of the wireless system 100. An example implementation of the cloud server 150 is shown in FIG. 2. As depicted, cloud server 150 may include a network information collection component 210, a mobile information collection component 220, an information analysis component 230, a network optimization component 240, a communication component 250, and a database 260. The functions of each of these components will be described in a greater detail below.

In one aspect, the network information collection component 210 can collect and store in the database 260 various statistical and predictive accessibility and performance information from radio nodes 110, 120 and 130 of the system 100. This information may be based on periodic Network Listen (NL) measurements on the radio nodes 110, 120 and 130 or measurements of data transmission on the core network 140. The data collected from the radio nodes 110, 120 and 130 and network 140 may include, but not limited to cell IDs, IP packet routes, average cell capacity used and available cell capacity, number of users served by each cell, number of connections established on each cell, time of day or instantaneous traffic pattern at backhaul or traffic pattern of mobile devices, number of cell reselections and handovers for each cell, types of handovers (e.g., intra-frequency, inter-frequency, inter-RAT, handovers to/from macrocell, handovers to/from femtocells, etc.), number of dropped calls, average downlink/uplink interference, and other performance and accessibility parameters.

In another aspect, the mobile information collection component 220 can collect and store in the database 260 various statistical and predictive data from mobile device(s) 105 connected to the radio nodes 110, 120 and 130. The mobile device(s) 105 can send compressed or raw measurement data over the air (OTT) to the cloud server 150. The data collected from mobile device(s) 105 may include, but not limited to various performance reports (e.g., key performance indicators (KPIs)), device location data (e.g., GPS data), statistics on mobile services used (e.g., voice, data, streaming), received signal strength indicators (RSSIs) from different radio nodes, service expectations (e.g., scheduled system updates, large downloads or synchronizations, etc.), number of cell reselections, number and type of handovers (e.g., intra-frequency, inter-frequency, inter-RAT, handovers to/from macrocell, handovers to/from femtocells, etc.), number of dropped calls, average downlink and uplink interference, and other performance, mobility and service information.

In another aspect, the information analysis component 230 can analyze information collected by components 210 and 220 to assess the performance, loading and distribution of network resource among the radio nodes 110, 120 and 130 in order to make more global and comprehensive improvements and optimizations in performance, loading and distribution of network resource among the radio nodes of the entire wireless communication system 100 then the local performance improvements that can be made by individual radio nodes based on distributed SON functions and algorithms of these nodes. For example, in one aspect, the analysis component 230 can analyze the collected data and make longer term (e.g., minutes, hours or days) decisions about overall network loading, loading of individual cells and distribution of network resources among collocated macro, femto and WiFi nodes, based on the performance of individual cells, tracking of the position of mobile devices, and services currently used and expected by the mobile devices. In one aspect, the analysis component 230 can perform statistical analysis of the received information from the radio nodes and the mobile devices to classify the mobile devices as belonging to one of a plurality of classes associated with the speed, location, and service levels of the mobile device. The classification of mobile devices may be performed collectively by grouping said mobile devices based on shared mobility patterns. The group of mobile devices may be managed as devices enter or leave the group. The sharing of mobility patterns may be due to the plurality of mobile devices being on a common transportation platform (e.g., buses and trains). For example, the analysis component 230 can identify platforms of fast moving mobile devices in order to accordingly adjust various cell reselection and handover parameters for radio nodes 110, 120 and 130 to reduce frequent cell reselections and handovers by mobile devices 105. In another aspect, the analysis component 230 can perform statistical analysis of the collected information to predict future behavior of the speed, location and service levels of the mobile device in order to plan future performance, loading and distribution of resource in the network 100.

In another aspect, the network optimization component 240 can determine, based on the analysis performed by component 230, optimization guidelines for performance, loading and distribution of network resources among the radio nodes 110, 120 and 130. For example, in one aspect, the optimization component 240 can provide optimization guidelines indicating whether to activate/deactivate new/old radio nodes to accommodate current and foreseeable (predicted) changes in the service patters or the number of mobile devices 105 based on various parameters (e.g., geography, time, etc.). In another aspect, the optimization component 240 can also, in combination with the distributed SON functions implemented by the individual radio nodes, dynamically adjust coverage area of macro nodes 110, 120 and 130 to increase offloading to a femto and WiFi nodes or back to macro nodes for high speed mobiles 105 to improve overall network performance. In another aspect, the optimization component 240 can optimize network or cluster performance of cell reselection parameters, such as as Qhyst, Qqualmin, Qoffset, Treselection, HCS, etc. of individual radio nodes. In another aspect, the optimization component 240 can optimize various cell handover parameters, ABS (Almost Blank Subframes) configuration, Hysteresis, Time-to-trigger (TTT), Cell individual offset, event offset (Ea3-offset), filter coefficient, frequency offset, and other parameters of the individual radio nodes. In yet another aspect, the optimization component 240 can combine the optimization guidelines with disparate sets of local SON optimization procedures, such as self-configuration, self-optimization, and self-healing functions, executed by each of the radio nodes 110, 120 and 130 to make resource optimization decisions specific to the individual or groups of mobile devices and mobile platforms 105. The optimization component 240 may also generate other optimization guidelines for improving local self-configuration, self-optimization, and self-healing functionalities and algorithms of the individual SON radio nodes 110, 120 and 130.

In yet another aspect, having generated optimization guidelines, the cloud server 150 can use communication component 150 to send via, for example, the core network 140 the optimization guidelines to the appropriate radio nodes 110, 120 and 130. The radio nodes can use these optimization guidelines together with their local SON functions to optimize performance, loading and distribution of network resources and to make resource optimization decisions specific to the individual mobile devices 105.

Figure 3:
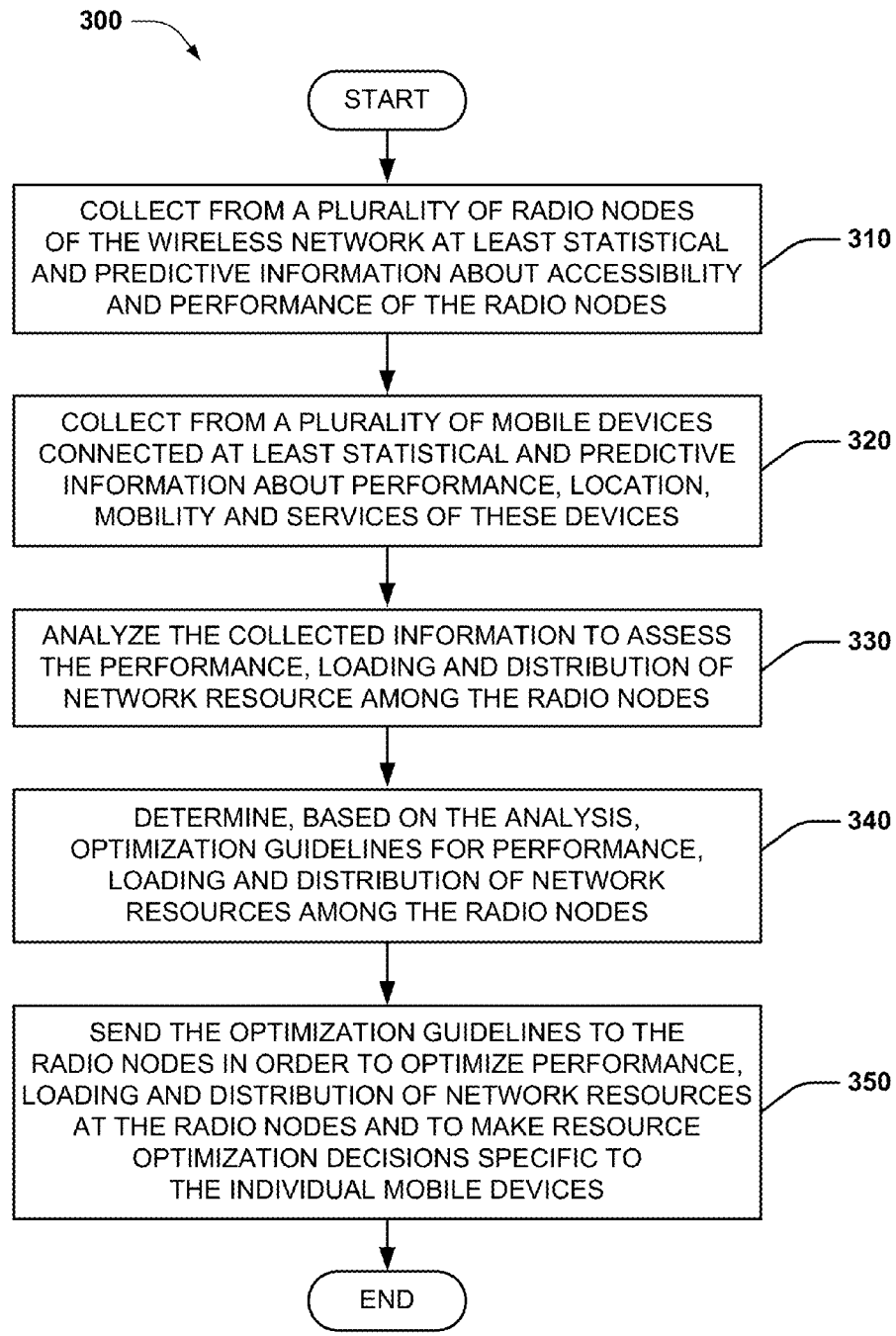
FIG. 3 is a flow diagram of an example methodology for server-based management of self-organizing wireless networks according to one aspect.

FIG. 3 shows an example methodology for cloud-based management of self-organizing wireless networks. The example methodology 300 may be defined in instructions stored on cloud server, such as cloud server 150 of FIGS. 1 and 2, or one or more components thereof, and executed by a processor to perform the described acts. While, for purposes of simplicity of explanation, the methodologies are shown and described as a series of acts, it is to be understood and appreciated that these methodologies is not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Turning to FIG. 3, at step 310, method 300 includes collecting from a plurality of radio nodes of the wireless network statistical and predictive information about accessibility and performance of these radio nodes. For example, in an aspect, the cloud server 150 may include a network information collection component 210 configured to collect statistical and predictive information about accessibility and performance of radio nodes 110, 120 and 130. At step 320, method 300 includes collecting from a plurality of mobile devices connected to the wireless network at least statistical and predictive information about performance, location, mobility and services of said devices. For example, in an aspect, the cloud server 150 may include a mobile information collection component 220 configured to collect statistical and predictive information about performance, location, mobility and services of mobile devices 105 connected to the wireless network 100. At step 330, the method 300 includes analyzing the collected information to assess the performance, loading and distribution of network resource among the plurality of radio nodes. For example, in one aspect, the cloud server 150 may include an information analysis component 230 configured to analyze the collected information to assess the performance, loading and distribution of network resource among the radio nodes 110, 120 and 130. At step 340, the method 300 includes determining, based on the analysis at step 330, optimization guidelines for performance, loading and distribution of network resources among the plurality of radio nodes. For example, in one aspect, the cloud server 150 may include a network optimization component 240 configured to determine optimization guidelines for performance, loading and distribution of network resources among the radio nodes 110, 120 and 130. At step 350, the method 300 includes sending the optimization guidelines to the plurality of radio nodes in order to optimize performance, loading and distribution of network resources at said radio nodes and to make resource optimization decisions specific to the individual mobile devices. For example, in one aspect, the cloud server 150 may include a communication component 250 configured to send optimization guidelines to the radio nodes 110, 120 and 130 of the wireless network 100.

Figure 4:
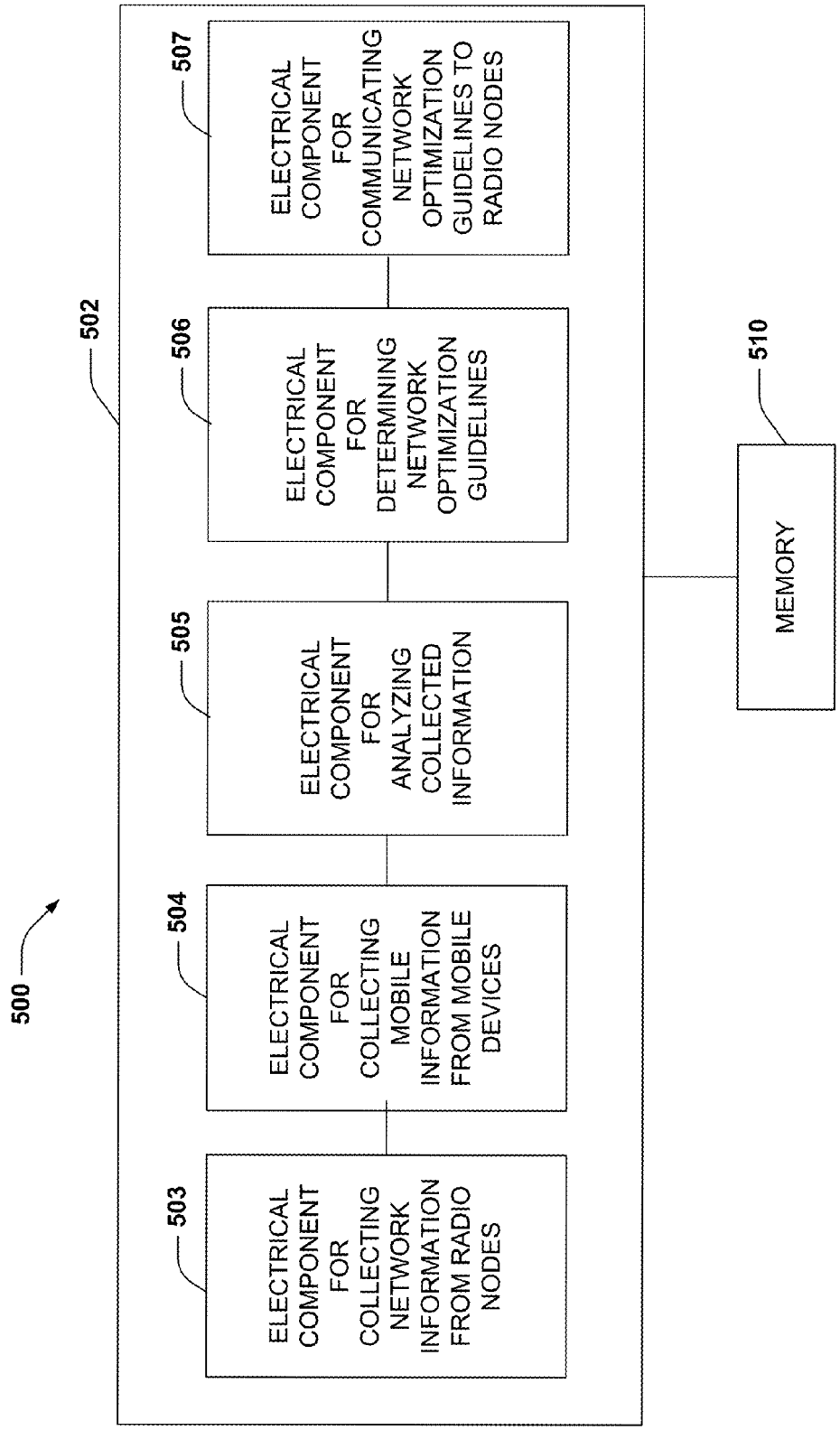
FIG. 4 is a block diagram of an example cloud server system for management of self-organizing wireless networks according to one aspect.

FIG. 4 illustrates one aspect of a server system for management of self-organizing wireless networks. For example, the system 500 can reside at least partially within a cloud server, such as cloud server 150 of FIGS. 1 and 2. It is to be appreciated that system 500 is represented as including functional blocks, which can be functional blocks that represent functions implemented by a processor, software, or combination thereof (e.g., firmware). System 500 includes a logical grouping 502 of electrical components that can act in conjunction. For instance, in one aspect, logical grouping 502 can include an electrical component 503 for collecting network information from radio nodes 110, 120 and 130. In addition, logical grouping 502 can include an electrical component 504 for collecting mobile information from mobile device(s) 105. Furthermore, logical grouping 502 can include an electrical component 505 for analyzing the collected information to assess the performance, loading and distribution of network resource among the radio nodes 110, 120 and 130. Furthermore, logical grouping 502 can include an electrical component 506 for determining network optimization guidelines. Furthermore, logical grouping 502 can include an electrical component 507 for communicating network optimization guidelines to the radio nodes.

Additionally, system 500 can include a memory 510 that retains instructions for executing functions associated with the electrical components 503-507. While shown as being external to memory 510, it is to be understood that one or more of the electrical components 503-507 can exist within memory 510. In one example, electrical components 503-507 can comprise at least one processor, or each electrical component 503-507 can be a corresponding module of at least one processor. Moreover, in an additional or alternative example, electrical components 503-507 can be a computer program product comprising a computer readable medium, where each electrical component 503-507 can be corresponding code.

Figure 5:
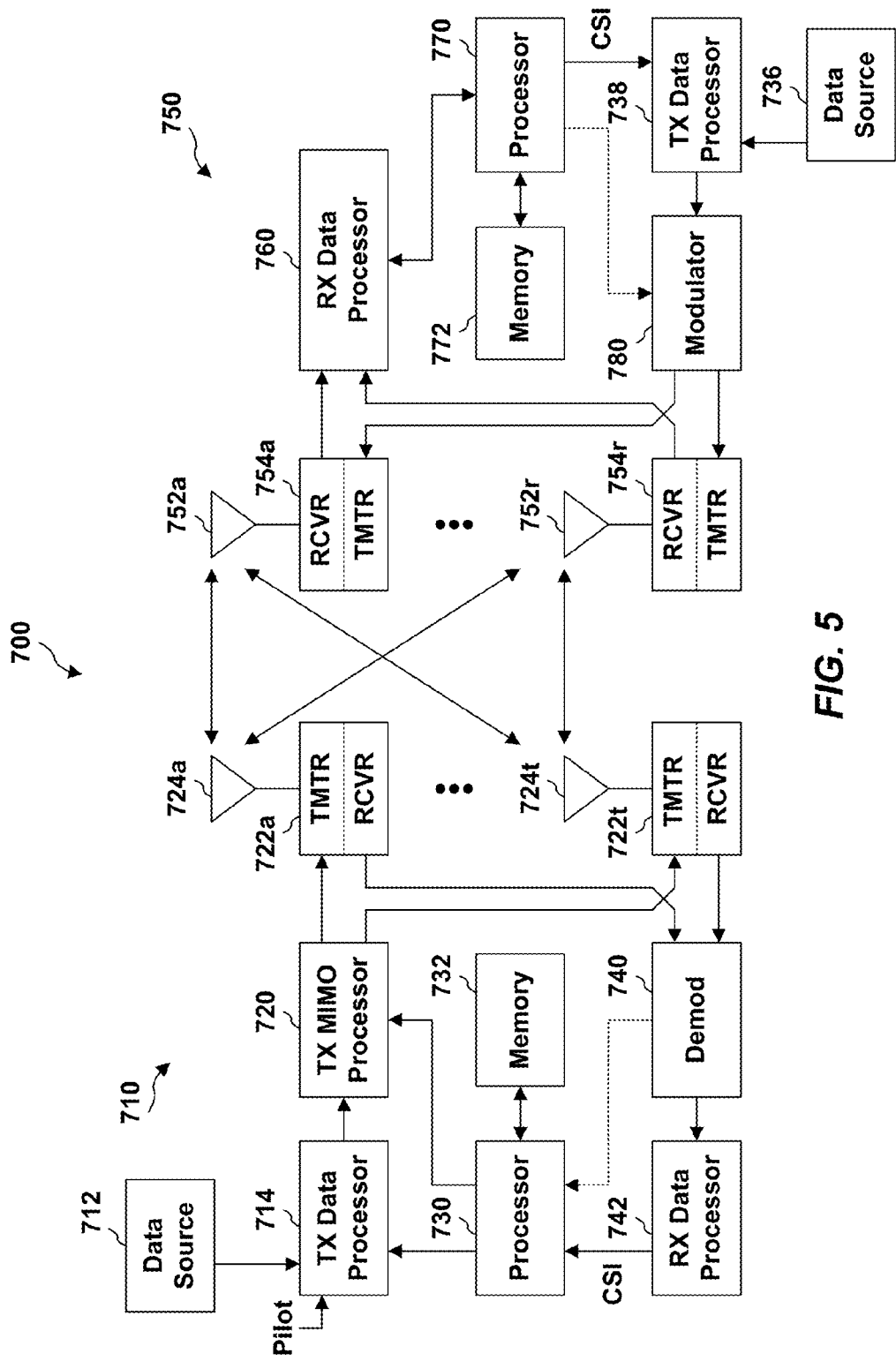
FIG. 5 is a block diagram of an example wireless communication system that can be employed in conjunction with the various systems and methods described herein.

FIG. 5 shows an example wireless communication system 700 in which systems and methods for cloud-based management of self-organizing wireless networks can be implemented. The wireless communication system 700 depicts one base station 710, which can include a macro node 110, femto node 120, or WiFi node 130 of FIG. 1, and one mobile device 750, such as mobile device 105 of FIG. 1. However, it is to be appreciated that system 700 can include more than one base station and/or more than one mobile device, wherein additional base stations and/or mobile devices can be substantially similar or different from example base station 710 and mobile device 750 described below. For example, distributed SON functions of the base station, such as radio nodes 110, 120 and 130 described herein with respect to FIG. 1 can be part of a memory 732 and/or 772 or processors 730 and/or 770 described below, and/or can be executed by processors 730 and/or 770 to perform the disclosed functions.

At base station 710, traffic data for a number of data streams is provided from a data source 712 to a transmit (TX) data processor 714. According to an example, each data stream can be transmitted over a respective antenna. TX data processor 714 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 750 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 730.

The modulation symbols for the data streams can be provided to a TX MIMO processor 720, which can further process the modulation symbols (e.g., for OFDM). TX MIMO processor 720 then provides $N_T$ modulation symbol streams to $N_T$ transmitters (TMTR) 722a through 722t. In various embodiments, TX MIMO processor 720 applies beamforming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 722a through 722t are transmitted from $N_T$ antennas 724a through 724t, respectively.

At mobile device 750, the transmitted modulated signals are received by $N_R$ antennas 752a through 752r and the received signal from each antenna 752 is provided to a respective receiver (RCVR) 754a through 754r. Each receiver 754 conditions (e.g., filters, amplifies, and downconverts) a respective signal, digitizes the conditioned signal to provide samples, and further processes the samples to provide a corresponding "received" symbol stream.

An RX data processor 760 can receive and process the $N_R$ received symbol streams from $N_R$ receivers 754 based on a particular receiver processing technique to provide $N_T$ "detected" symbol streams. RX data processor 760 can demodulate, deinterleave, and decode each detected symbol stream to recover the traffic data for the data stream. The processing by RX data processor 760 is complementary to that performed by TX MIMO processor 720 and TX data processor 714 at base station 710.

The reverse link message can comprise various types of information regarding the communication link and/or the received data stream. The reverse link message can be processed by a TX data processor 738, which also receives traffic data for a number of data streams from a data source 736, modulated by a modulator 780, conditioned by transmitters 754a through 754r, and transmitted back to base station 710.

At base station 710, the modulated signals from mobile device 750 are received by antennas 724, conditioned by receivers 722, demodulated by a demodulator 740, and processed by a RX data processor 742 to extract the reverse link message transmitted by mobile device 750. Further, processor 730 can process the extracted message to determine which precoding matrix to use for determining the beamforming weights.

Processors 730 and 770 can direct (e.g., control, coordinate, manage, etc.) operation at base station 710 and mobile device 750, respectively. Respective processors 730 and 770 can be associated with memory 732 and 772 that store program codes and data. Processors 730 and 770 can also perform functionalities described herein to support selecting a paging area identifier for one or more femto nodes.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

The invention claimed is:

1. A method including at least management of a wireless network by a server, comprising:
    collecting, by the server, from a plurality of radio nodes of the wireless network radio node information indicative of one or both of accessibility or performance of the plurality of radio nodes, wherein the radio node information comprises cell identification, cell usage information, cell condition information, or combination thereof;
    collecting, by the server, from a plurality of mobile devices connected to the wireless network at least statistical and predictive information about performance, location, mobility, services currently used and expected services of the plurality of mobile devices, wherein collecting the statistical and predictive information about performance, location, mobility, services currently used and expected services of the plurality of mobile devices comprises collecting mobile position information and mobile service information over a time period and wherein the expected services include at least one of scheduled updates, downloads, or synchronizations;
    analyzing, by the server, the collected information from the plurality of radio nodes and the plurality of mobiles devices to assess the one or more of performance, loading or distribution of network resource among the plurality of radio nodes;
    determining, by the server, based on the analysis, optimization guidelines for improving the one or more of performance, loading or distribution of network resources among the plurality of radio nodes; and
    sending, by the server, the optimization guidelines to the plurality of radio nodes in order to optimize the one or more of performance, loading or distribution of network resources at the plurality of radio nodes and to make resource optimization decisions specific to the plurality of mobile devices.

2. The method of claim 1, wherein determining, by the server, optimization guidelines further includes combining the optimization guidelines with disparate sets of optimization procedures executed at the plurality of radio nodes to make resource optimization decisions specific to an individual mobile device or groups of mobile devices from the plurality of mobile devices.

3. The method of claim 1, wherein the radio node information further comprises one or more of number of mobile devices served by the cell, number of connections established, traffic pattern at backhaul or traffic pattern of mobile devices served, number of cell reselections and handovers, types of handovers, number of call drops, average downlink interference, or average uplink interference.

4. The method of claim 1, wherein statistical and predictive information about the performance, location, mobility, services currently used and expected services of the plurality of mobile devices includes one or more of: mobile performance reports, mobile location data, mobile speed, statistics on network services used, service expectations, number of cell reselections, number and type of handovers, number of call drops, average uplink interference, or average downlink interference.

5. The method of claim 1, wherein determining optimization guidelines further includes: determining whether to activate one or more new radio nodes on the wireless network to accommodate current and predicted changes in the services or number of mobile devices connected to the wireless network.

6. The method of claim 1 further comprising: performing statistical analysis of the collected information from the plurality of radio nodes and the plurality of mobile devices to classify the plurality of mobile devices as belonging to one of a plurality of classes associated with one or more of speed, location, or service levels of a mobile device from the plurality of mobile devices.

7. The method of claim 6, wherein the classification of the plurality of mobile devices is performed collectively by grouping the mobile devices based on shared mobility patterns.

8. The method of claim 7, wherein the sharing of mobility patterns is due to the plurality of mobile devices being on a common transportation platform.

9. The method of claim 7, wherein a group of mobile devices is managed as devices enter or leave the group.

10. The method of claim 1 further comprising: performing statistical analysis of the collected information to predict future behavior of one or more of speed, location or service levels of the plurality of mobile device.

11. The method of claim 1, wherein a radio node from the plurality of radio nodes is one of a femto node, macro node or WiFi node.

12. The method of claim 1, wherein the wireless network is a self organizing network.

13. The method of claim 1, further comprising:
    deactivating one or more old radio nodes on the wireless network to accommodate current and predicted changes in the services or number of mobile devices connected to the wireless network based on the optimization guidelines.

14. The method of claim 1, wherein the time period is greater than one hour.

15. A server apparatus for at least management of a wireless network, comprising:
    at least one processor;
    a memory communicatively coupled with the at least one processor, with the at least one processor and the memory are operable to:
    collect from a plurality of radio nodes of the wireless network radio node information indicative of one or both of accessibility or performance of the plurality of radio nodes, wherein the radio node information comprises cell identification, cell usage information, cell condition information, or combination thereof;
    collect from a plurality of mobile devices connected to the wireless network at least statistical and predictive information about performance, location, mobility, services currently used and expected services of the plurality of mobile devices, wherein collecting the statistical and predictive information about performance, location, mobility, services currently used and expected services of the plurality of mobile devices comprises collecting mobile position information and mobile service information over a time period and wherein the expected services include at least one of scheduled updates, downloads, or synchronizations;

analyze the collected information from the plurality of radio nodes and the plurality of mobile devices to assess the one or more of performance, loading or distribution of network resource among the plurality of radio nodes;

determine, based on the analysis, optimization guidelines for the one or more of performance, loading or distribution of network resources among the plurality of radio nodes; and send the optimization guidelines from the cloud server to the plurality of radio nodes in order to optimize the one or more of performance, loading or distribution of network resources at the radio nodes and to make resource optimization decisions specific to the plurality of mobile devices.

16. The server apparatus of claim 15, wherein the at least one processor and the memory are further operable to combine the optimization guidelines for the plurality of radio nodes with disparate sets of optimization procedures executed at the plurality of radio nodes to make resource optimization decisions specific to an individual mobile device or groups of mobile devices from the plurality of mobile devices.

17. The server apparatus of claim 15, wherein the radio node information further comprises one or more of number of mobile devices served by the cell, number of connections established, traffic pattern at backhaul or traffic pattern of mobile devices served, number of cell reselections and handovers, types of handovers, number of call drops, average downlink interference, or average uplink interference.

18. The server apparatus of claim 15, wherein statistical and predictive information about the performance, location, mobility, services currently used and expected services of the plurality of mobile devices includes one or more of: mobile performance reports, mobile location data, mobile speed, statistics on network services used, service expectations, number of cell reselections, number and type of handovers, number of call drops, average uplink interference, or average downlink interference.

19. The server apparatus of claim 15, wherein the at least one processor and the memory are operable to determine whether to activate one or more new radio nodes on the wireless network to accommodate current and predicted changes in the services or number of mobile devices connected to the wireless network.

20. The server apparatus of claim 15, wherein the at least one processor and the memory are operable to perform statistical analysis of the collected information from the plurality of radio nodes and the plurality of mobile devices to classify the plurality of mobile devices as belonging to one of a plurality of classes associated with one or more of speed, location, or service levels of the plurality of mobile device.

21. The server apparatus of claim 20, wherein the at least one processor and the memory are operable collectively classify the plurality of mobile devices by grouping the plurality of mobile devices based on shared mobility patterns.

22. The server apparatus of claim 21, wherein the sharing of mobility patterns is due to the plurality of mobile devices being on a common transportation platform.

23. The server apparatus of claim 21, wherein a group of mobile devices is managed as devices enter or leave the group.

24. The server apparatus of claim 15, wherein the at least one processor and the memory are operable to perform statistical analysis of the collected information to predict future behavior of one or more of speed, location or service levels of the plurality of mobile device.

25. The server apparatus of claim 15, wherein a radio node from the plurality of radio nodes is one of a femto node, macro node or WiFi node.

26. The server apparatus of claim 15, wherein the wireless network is a self organizing network.

27. The server apparatus of claim 15, wherein the at least one processor and the memory are operable to:
deactivate one or more old radio nodes on the wireless network to accommodate current and predicted changes in the services or number of mobile devices connected to the wireless network based on the optimization guidelines.

28. A non-transitory computer-readable medium for at least management of a wireless communication network, comprising:
code for causing at least one server computer to collect from a plurality of radio nodes of the wireless network radio node information indicative of one or both of accessibility or performance of the plurality of radio nodes, wherein the radio node information comprises cell identification, cell usage information, cell condition information, or combination thereof;
code for causing at least one server computer to collect from a plurality of mobile devices connected to the wireless network at least statistical and predictive information about performance, location, mobility, services currently used and expected services of the plurality of mobile devices, wherein collecting the statistical and predictive information about performance, location, mobility, services currently used and expected services of the plurality of mobile devices comprises collecting mobile position information and mobile service information over a time period and wherein the expected services include at least one of scheduled updates, downloads, or synchronizations;
code for causing at least one server computer to analyze the collected information from the plurality of radio nodes and the plurality of mobile devices to assess the one or more of performance, loading or distribution of network resource among the plurality of radio nodes;
code for causing at least one server computer to determine, based on the analysis, optimization guidelines for the one or more of performance, loading or distribution of network resources among the plurality of radio nodes; and
code for causing at least one server computer to send the optimization guidelines to the plurality of radio nodes in order to optimize the one or more of performance, loading or distribution of network resources at the plurality of radio nodes and to make resource optimization decisions specific to the plurality of mobile devices.

29. The computer-readable medium of claim 28, wherein the code for causing at least one server computer to determine optimization guidelines further includes code for combining the optimization guidelines for the plurality of radio nodes with disparate sets of optimization procedures executed at the plurality of radio nodes to make resource optimization decisions specific to an individual mobile device or groups of mobile devices from the plurality of mobile devices.

30. The computer-readable medium of claim 28, wherein the radio node information further comprises one or more of number of mobile devices served by the cell, number of connections established, traffic pattern at backhaul or traffic pattern of mobile devices served, number of cell reselections and handovers, types of handovers, number of call drops, average downlink interference, or average uplink interference.

31. The computer-readable medium of claim 28, wherein statistical and predictive information about the performance, location, mobility, services currently used and expected services of the plurality of mobile devices includes one or more of: mobile performance reports, mobile location data, mobile speed, statistics on network services used, service expectations, number of cell reselections, number and type of handovers, number of call drops, average uplink interference, or average downlink interference.

32. The computer-readable medium of claim 28, wherein the code for causing at least one server computer to determine optimization guidelines further includes code for determining whether to activate one or more new radio nodes on the wireless network to accommodate current and predicted changes in the services or number of mobile devices connected to the wireless network.

33. The computer-readable medium of claim 28, wherein the code for causing at least one server computer to analyze the collected information further includes code for performing statistical analysis of the collected information from the plurality of radio nodes and the plurality of mobile devices to classify the plurality of mobile devices as belonging to one of a plurality of classes associated with one or more of speed, location, or service levels of a mobile device from the plurality of mobile devices.

34. The computer-readable medium of claim 33, wherein the code for causing at least one server computer to analyze the collected information further includes code for collectively classifying the plurality of mobile devices by grouping the plurality of mobile devices based on shared mobility patterns.

35. The computer-readable medium of claim 28, wherein the code for causing at least one server computer to analyze the collected information further includes code for performing statistical analysis of the collected information to predict future behavior of one or more of speed, location or service levels of a mobile device from a plurality of mobile devices.

36. The computer-readable medium of claim 28, further comprising:
　　code for causing at least one server computer to deactivate one or more old radio nodes on the wireless network to accommodate current and predicted changes in the services or number of mobile devices connected to the wireless network based on the optimization guidelines.

* * * * *